US012571641B2

(12) United States Patent
Oswald et al.

(10) Patent No.: US 12,571,641 B2
(45) **Date of Patent: \*Mar. 10, 2026**

(54) VEHICLE NAVIGATION AND CONTROL SYSTEM AND METHOD

(71) Applicant: Transportation IP Holdings, LLC, Norwalk, CT (US)

(72) Inventors: James A. Oswald, Coggon, IA (US); Jeffrey D. Kernwein, Cedar Rapids, IA (US); Michael Bratcher, Azle, TX (US)

(73) Assignee: Transportation IP Holdings, LLC, Norwalk, CT (US)

( \* ) Notice: Subject to any disclaimer, the term of this patent is extended or adjusted under 35 U.S.C. 154(b) by 929 days.

This patent is subject to a terminal disclaimer.

(21) Appl. No.: 17/834,343

(22) Filed: Jun. 7, 2022

(65) Prior Publication Data

US 2022/0299336 A1 Sep. 22, 2022

Related U.S. Application Data

(63) Continuation-in-part of application No. 16/549,981, filed on Aug. 23, 2019, now Pat. No. 11,385,066, which is a continuation-in-part of application No. 15/592,760, filed on May 11, 2017, now abandoned, and a continuation-in-part of application No. 15/382,922, filed on Dec. 19, 2016, now Pat. No. 10,392,040.

(51) Int. Cl.
*G01C 21/36* (2006.01)
*H04W 4/029* (2018.01)

(52) U.S. Cl.
CPC ........ *G01C 21/3658* (2013.01); *H04W 4/029* (2018.02)

(58) Field of Classification Search
CPC ........ B61L 25/00; B61L 25/02; B61L 25/023; B61L 25/028; B61L 25/04; B61L 25/06; B61L 27/00; B61L 27/04
See application file for complete search history.

(56) References Cited

U.S. PATENT DOCUMENTS

| | | | |
|---|---|---|---|
| 6,480,766 B2 | 11/2002 | Hawthorne et al. | |
| 10,392,040 B2 * | 8/2019 | Oswald ................. | B61L 25/021 |
| 2001/0044695 A1 | 11/2001 | Doner | |
| 2009/0105893 A1 | 4/2009 | Kernwein | |
| 2012/0133553 A1 | 5/2012 | Schmidt-Karaca et al. | |
| 2016/0355199 A1 | 12/2016 | Kernwein et al. | |

OTHER PUBLICATIONS

Search Report for corresponding Brazilian Patent Application No. BR 11 2019 012523-0. English translation provided. (8 pages).

\* cited by examiner

*Primary Examiner* — Robert J McCarry, Jr.
(74) *Attorney, Agent, or Firm* — K&L Gates LLP

(57) ABSTRACT

A vehicle control system includes a controller that may receive location data points indicative of locations of a vehicle as measured by a location sensor. This controller may determine a distribution of the location data points and identify one or more of a route or a lane of a route in which the vehicle is disposed by comparing the distribution of the location data points to one or more characteristics of the one or more of the route or the lane of the route.

20 Claims, 10 Drawing Sheets

VEHICLE NAVIGATION AND CONTROL SYSTEM AND METHOD

CROSS-REFERENCE TO RELATED APPLICATIONS

This application is a continuation-in-part of U.S. patent application Ser. No. 16/549,981 (filed 23 Aug. 2019), which is a continuation-in-part of U.S. patent application Ser. No. 15/382,922 (filed 19 Dec. 2016, now U.S. Pat. No. 10,392, 040) and is a continuation-in-part of U.S. patent application Ser. No. 15/592,760 (filed 11 May 2017). The entire subject matter of each of these applications is incorporated herein by reference.

BACKGROUND

Technical Field

Embodiments of the subject matter disclosed herein relate to vehicle navigation systems and methods.

State of Art

Vehicle systems and networks exist throughout the world, and, at any point in time, a multitude of vehicles, such as cars, trucks, buses, trains, mining vehicles, aircraft, and the like, are travelling throughout the system and network. With specific reference to trains travelling in a track network, the locomotives of such trains are typically equipped with or operated using train control, communication, and management systems (e.g., positive train control (PTC) systems), such as the I-ETMS® of Wabtec Corp. Navigation and enforcement systems and processes are implemented, both at the train level and the central dispatch level to effectively manage the trains.

Tracking locations of the vehicles can be important to operate the vehicles efficiently, avoid collisions, and the like. But not all known navigation systems may be able to accurately track locations of vehicles and effectively implement responsive actions in the event that the locations of vehicles indicate inefficient operation and/or an impending collision.

It may be desirable to have a system and method that differs from those that are currently available.

BRIEF DESCRIPTION

In one example, a vehicle control system is provided that includes a controller that may receive location data points indicative of locations of a vehicle as measured by a location sensor. This controller may determine a distribution of the location data points and identify one or more of a route or a lane of a route in which the vehicle is disposed by comparing the distribution of the location data points to one or more characteristics of the one or more of the route or the lane of the route.

In another example, a method (for identifying which lane or road a vehicle is in and/or for controlling movement of the vehicle) is provided. The method may include receiving location data points indicative of locations of a vehicle, determining a distribution of the location data points, and identifying one or more of a route or a lane of a route in which the vehicle is disposed by comparing the distribution of the location data points to one or more characteristics of the one or more of the route or the lane of the route.

In another example, a vehicle control system is provided. The system may include a controller configured to receive location data points indicative of locations of first and second vehicles of a vehicle group as measured by first and second location sensors. The controller may determine a distribution of the location data points and identify a route and/or a lane of a route in which the vehicle group is disposed by comparing the distribution of the location data points to one or more characteristics of the one or more of the route or the lane of the route.

BRIEF DESCRIPTION OF THE DRAWINGS

The subject matter described herein includes descriptions of non-limiting embodiments, with reference to the attached drawings, wherein below.

DETAILED DESCRIPTION

Embodiments of the subject matter disclosed herein relate to a system and method for determining a location of a vehicle and/or a vehicle group to which the vehicle belongs. The vehicle location may be with reference to a particular route, which is one of a plurality of possible routes, or a particular lane, channel, or envelope of a known route, which is one of a plurality of possible lanes, channels, or envelopes that make up a route. In one embodiment, the system and method may glean information about an operational state of a switch or intersection control device.

Figure 1:
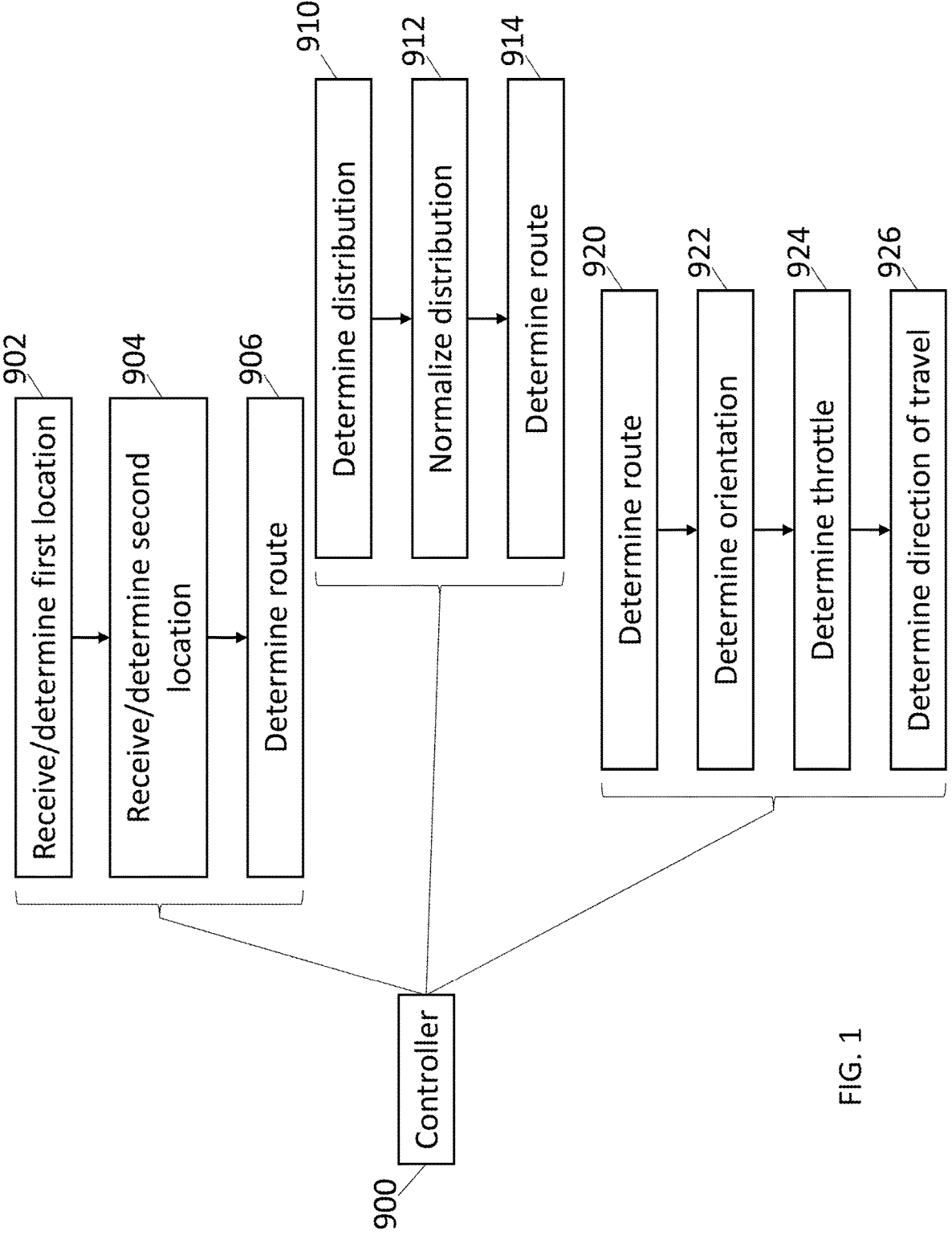
FIG. 1 is a diagrammatic view of a controller for determining route or lane location and direction of travel according to one embodiment.

With reference to FIG. 1, a diagram is shown of a controller 900 according to one embodiment. The controller can represent hardware circuitry that includes and/or is connected with one or more processors (e.g., microprocessors, integrated circuits, field programmable gate arrays, etc.) that perform the operations described herein in connection with the controller. The controller may receive or determine (902) at least one first location associated with at least a first vehicle. This first vehicle may be a solo vehicle traveling alone, or may be part of a vehicle group. The vehicle group may be formed from the first vehicle and at least one additional vehicle. The vehicles in the vehicle group may be mechanically coupled with each other (e.g., such as a train or consist, a car or truck pulling a trailer, agricultural vehicles coupled together, etc.) or may be mechanically separate but coordinate movements so that the vehicles in the vehicle group travel together (e.g., as in a convoy, platoon, swarm, etc.). The controller may receive or determine (904) at least a second location associated with the first vehicle or another vehicle (e.g., a second vehicle) in the vehicle group. The controller may determine (906) a route or lane from several possible routes or lanes on which the vehicle or vehicle group is located based at least in part on the at least one first location and on the at least one second location. For example, the controller can identify which segment of a road, track, path, or the like, that the first vehicle, second vehicle, or vehicle group is located on based on the first and second locations. As another example, the controller can identify which lane of a multi-lane road or highway that the first vehicle, second vehicle, or vehicle group is on based on the first and second locations.

The controller may determine (910) a distribution of the first location and the second location and normalize (912) the distribution to route data, such as a centerline of the route, a left edge of the route, a right edge of the route, or the like. The first location and/or the second location may include multiple location data points obtained or determined over a period of time. For example, the first location and/or the second location may be a collection of several locations of the first vehicle, the second vehicle, and/or the vehicle group at different points in time. The controller may select (914) the route from the group of possible routes on which the first vehicle, the second vehicle, or the vehicle group is located based at least in part on the normalized distribution that is determined.

For example, the controller may receive the location data points indicating different measurements of locations of the same and/or other vehicles. These data points may not always indicate the exact centerline of a lane of a route or of a single lane route. The controller can calculate a distribution (e.g., a normal distribution, a Poisson distribution, etc.) of the location data points. The controller can determine a center of the distribution and compare this center to the known or previously measured centerlines of several routes or lanes. The route or lane having the centerline that is closest to the center of the distribution may be identified as the route or lane in which the vehicle or vehicle group is located.

The controller may select (920) the route or lane from the group of possible routes or lanes based at least in part on a spatial relationship of the first vehicle to the second vehicle. This spatial relationship may be a distance between the vehicles, headings of the vehicles, relative speeds of the vehicles, etc. The controller may receive or determine (922) a direction of orientation of the first vehicle, receive or determine (924) a throttle position or setting of the first vehicle, and determine (926) a direction of travel of the vehicle group on the route or lane based at least in part on the direction of orientation and on the throttle position.

Figure 2A:
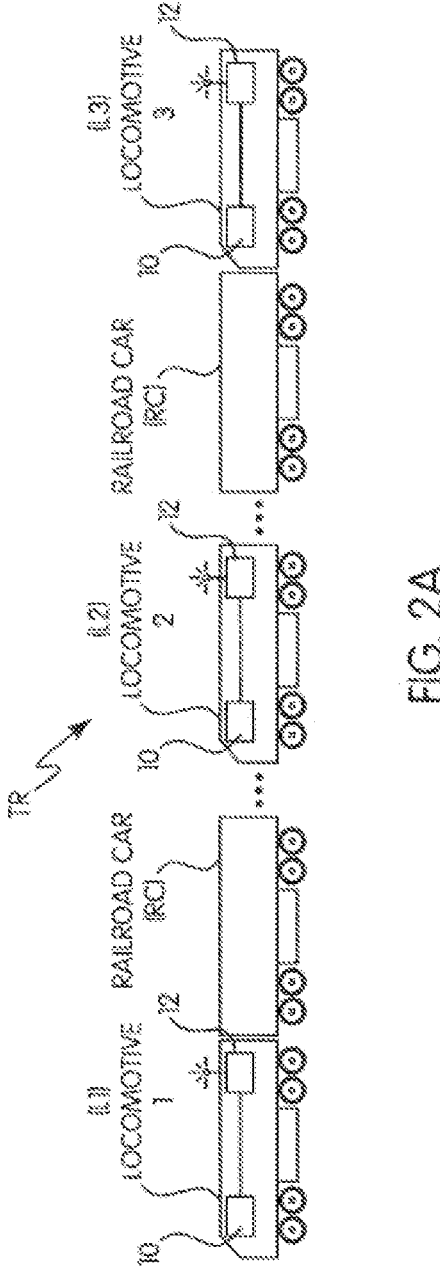
FIGS. 2A and 2B are schematic views of a system for determining route or lane location and direction of travel according to one embodiment.
Figure 2B:
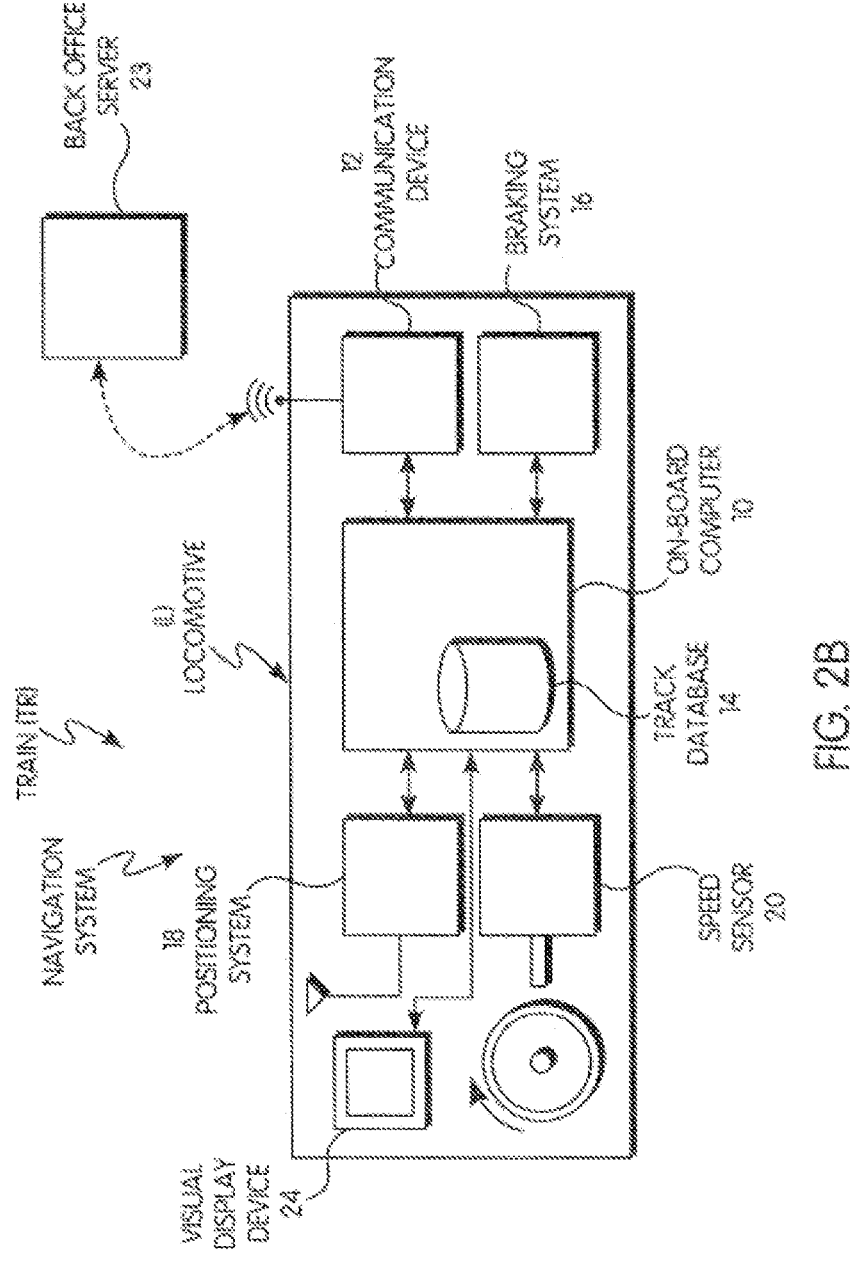

With reference to FIGS. 2A and 2B, the methods and systems described herein may be used in connection with control vehicles or cars that may be in a vehicle group. The control vehicles may be the vehicles that control or direct movement of the vehicle group, such as by pulling other vehicles in the group, pushing other vehicles in the group, directing throttle settings or speeds of the other vehicles in the group, directing brake settings of the other vehicles in the group, etc. In the illustrated embodiment, the control vehicle can be a locomotive (L) and the vehicle group can be a train (TR) that include the locomotive and a plurality of rail cars coupled to the locomotive. Optionally, the vehicles may be another type of vehicle, such as automobiles, buses, trucks, marine vessels, aircraft (manned or unmanned), agricultural vehicles, mining vehicles, or other off-highway vehicles. While one or more embodiments are described in connection with a rail vehicle system, not all embodiments are limited to rail vehicle systems. Unless expressly disclaimed or stated otherwise, the subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) may be formed from a single vehicle or multiple vehicles. With respect to multi-vehicle systems, the vehicles may be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

The control vehicles or control cars that may be positioned at the forefront, the rear, or intermediately in the vehicle group relative to the direction of travel. As the direction of travel changes, the disposition of the vehicles or control cars may change relative to the vehicle group, and similarly, the vehicle group's constitution and order may change. For example, in a vehicle group having several vehicles, different ones of these vehicles may be the control vehicle during different periods of time during a trip of the vehicle group. The methods and systems described herein may be used in connection with a swarm, a platoon, an "electrical multiple unit" (EMU), "diesel multiple unit" (DMU) configurations, or the like. The vehicle group may include only one control vehicle and/or some or no other vehicles. Multiple vehicles or control cars may be included in the vehicle group to facilitate the reduction of the vehicle group to match with passenger, cargo, or some other demand or requirement. Further, the method and systems described herein can be used in connection with commuter vehicle groups, freight vehicle groups, push-pull vehicle group configurations, and/or other vehicle group arrangements and systems. The vehicle group may be separated into different configurations (e.g., other vehicle groups) and moved in either a first direction and/or a second direction. The configuration or arrangement of vehicles, control cars, and/or other vehicles may be designated as a vehicle group and/or a consist. Also, an auxiliary vehicle may be included in the vehicle group. Suitable auxiliary vehicles may include a maintenance vehicle, an inspection vehicle, a drone craft, a multi-mode vehicle (e.g., equipped to ride both on a road and on the rails of the track, or on land and in the water) and/or the like.

The illustrated embodiment may determine a route location and a direction of travel (e.g., heading). The system may include a controller or computer 10, a communication device 12 (e.g., transceiving circuitry, such as transceivers, antennas, modems, etc.), a vehicle group management computer, a remote server, a back-office server 23, a wayside device, a vehicle group control and dispatch system, a networked computer system, or a combination of two or more thereof. In one embodiment, a traction control or braking system 16 may be included. A suitable navigation system may include a location sensor, such as one or more of a global navigation and satellite system (GNSS) receiver, such as a Global Positioning System (GPS) receiver 18, a wheel tachometer (not shown), or a speed sensor 20. Other navigation systems may include an inertial navigation system, and a propulsion motor with an encoder. The navigation system may include a visual display device 24 (or operator interface). The operator interface may exchange information and data to and from the operator.

A suitable controller or computer may include an on-board computer, a remotely located or remote computer or server, a vehicle group management computer, an on-board processing system, and/or the like. A suitable vehicle group control and dispatch system may include the i-ETMS and the Movement Planner systems available from Wabtec Corporation. In one embodiment, the steps in the system, process, and method discussed hereinafter may be implemented and/or executed onboard a control vehicle. In other embodiments, some or all of the steps in the system, process, and method discussed hereinafter may be implemented and/or executed by a computer or processor that may be remote from the vehicle group, where the remote computer or processor may be in direct or indirect communication with the communication device of a vehicle in the vehicle group. Suitable remote computers or processors may include a central controller, a back-office server, a remote server, central dispatch, back-office PTC components, various wayside devices, such as signal or switch monitors, or other off-board devices that communicate with an on-board controller.

In one embodiment, the vehicles of the vehicle group each may communicate with each other using a vehicle-to-vehicle communication system. Alternatively or additionally, the vehicles may all communicate back to an off-board system that controls or otherwise relays instructions and/or information to the vehicles; and, according to one aspect the off-board system communicates with one (or a few) vehicles in the vehicle group (that is, the control vehicle(s)) that in turn communicate with the remaining vehicles in the vehicle group. In other embodiments, communication may occur with and/or between multiple vehicle groups. Further, the makeup of a vehicle group may be dynamic, with vehicles joining or leaving one vehicle group, while then leaving or joining another vehicle group. The system manages the handoff in communication and/or control for such group transitions.

In one embodiment, the system may determine a route location and a direction of travel for a vehicle group including a control vehicle. A system architecture that may support the functionality of at least some of the methods and systems described herein includes the vehicle group management computer or controller, a positioning device or navigation system, and communication equipment. The control vehicle(s) may be equipped with the controller capable of implementing or facilitating a vehicle group action and the communication device in communication with the controller and capable of receive, transmit, and/or process data signals. While the communication device may be a wireless communication device, as discussed herein, this communication device may transmit, process, and/or receive signals over a vehicle powerline, using an ECP component, using fiber optics, wirelessly, through the rails, and/or the like.

The vehicle group may optionally include one or more other vehicles. Example of other vehicles that are not in communication with the system controller include non-propulsion-generating vehicles that do not or are incapable of propelling themselves. Examples of such vehicles include railcars (RC), trailers, or the like. In one embodiment, a control vehicle may be communicatively coupled with the other vehicles in the vehicle group. The vehicles in the vehicle group may be communicatively coupled and/or mechanically coupled (in either instance, the vehicle group may be sometimes referred to as a consist, a platoon or a swarm). The vehicle group may include a plurality of control vehicles (L1, L2, L3) and a plurality of other vehicles (such as rail cars (RC) in the illustrated embodiment). In another embodiment, the vehicle group may include only a single control vehicle and no other vehicles. As described above, optionally, the vehicles in the vehicle group may not be mechanically coupled with each other.

Suitable communication devices may facilitate the communications between controllers in one or more of the control vehicles or control cars of a vehicle group, communications with a wayside device (e.g., signals, switch monitors, wayside devices, sensors, and the like), and/or communications with a remote server. Remote servers may include cloud-based systems or edge devices. Examples may include a back-office server, a central controller, central dispatch, and/or the like. The system may interface with a route database 14. A route database may include information about route positions or locations, grades, curvatures, number of lanes, intersections and switch locations, crossing locations, group make up and identification, and the like. Additional information may include route heading changes (e.g., curves, distance measurements, grades, etc.). Suitable vehicle group information may include the number of control vehicles or control cars, the number of other vehicles, the total length of the vehicle group, the specific identification numbers of each control vehicle, or the like. Additional information may include manifest information, freight type and amounts, passenger information, cargo information, or the like. Yet other information may include the model and type of propulsion systems available, fuel levels, equipment health and status, age of equipment, and the like. In one embodiment, the software type and version information may be included.

Suitable traction control or braking systems may include propulsion and braking systems that propel and/or brake the vehicle. The traction control system may include, or be coupled with, an energy source (such as a direct current, or DC, bus), power electronics (for managing the electricity), and one or more electric motors. The motors may be used to propel the vehicle and, in dynamic braking mode, may be used to reduce or retard the speed of a vehicle. In one embodiment, by supplying a controlled amount of electrical current to the traction motor the traction control system may hold the vehicle in place even against the pull of gravity (such as when the vehicle is on a hill or a grade). The braking system may be a dynamic braking system, such as described, or may be a friction braking system. The braking system may engage to reduce a speed of the vehicle or may hold a vehicle in place even against the pull of gravity (such as when the vehicle is on a hill or a grade).

The controller may be located in or on a control vehicle in the vehicle group, and the controller may include or may be in communication with the route database populated with data and/or which receives specified data and information from other vehicle groups, remote servers, back-office servers, central dispatch, and/or the like. This data may include route profile data, vehicle group data, information about switch or intersection locations, route heading changes (e.g., curves, and distance measurements), vehicle group or consist information (e.g., the number of vehicles, the number of cars, the width and/or length of the vehicle group), and/or the like. Optionally, another type of vehicle group management system can be used.

During operation, navigation or position reports may drift around within an accuracy bubble over time and space. For example, the measured or sensed locations of the vehicle or vehicle group may vary around an accurate location by a deviation value that represents the accuracy bubble. The location or position information from a single vehicle may use aspects of the inventive subject matter to distinguish one route from another where the vehicle may be on one of several available routes. For example, with a GNSS accuracy of a location of about ten feet (shown by the circles in FIG. 3) and a minimum or other lower limit on route spacing of about fourteen feet, a single position report (by itself) from a vehicle can leave ambiguity in determining on which route a vehicle is located. Position X, associated with Vehicle 1, is closer to Route B than Route A. A schematic view of a vehicle group in an example route network is shown that can determine and distinguish a specific route, lane, or track that is occupied by a vehicle. It may indicate a direction of travel of a vehicle group. The vehicle group may include at least two control vehicles or control cars (L1, L2) and, optionally, a non-control car (RC). The routes in this example are tracks, and the tracks may form a track network having a plurality of tracks (Track A, Track B). Optionally, the tracks can represent roads, highways, waterways, air paths, ground paths, etc.

During operation the controller of the vehicle can receive location position reports including GNSS or GPS coordinates from the positioning system onboard the control vehicles (L1, L2) and/or non-control vehicles of the vehicle group. The communication device(s) of the control vehicles can transmit position reports to the other vehicles (control vehicles or otherwise) in the vehicle group and/or to the back-office server. The back-office server can transmit the position reports received from a vehicle in the vehicle group to the other vehicles in the vehicle group and/or to the other vehicles in the other vehicle groups. Location information associated with vehicles in the track network can thus be shared between the vehicles, the back-office server, and/or other computing devices in a PTC system.

The controller may determine a lane (e.g., a lateral portion of less than all of a route), route, or envelope on or in which the vehicle (and by implication, the vehicle group) may be located and, optionally, a direction of travel of the vehicle group based at least partly on the available location information. In one embodiment, the controller of one or more of the vehicles (L1, L2) can analyze the position information from multiple vehicles (L1, L2) in the same vehicle group or consist to determine which lane or route is occupied by each or all of the vehicles in the vehicle group. The controller of one or more of the vehicles (L1, L2) and/or a remote computer can determine a location of the one or more vehicles based at least in part on one or more of consist (or vehicle group) information, vehicle-to-vehicle spacing, optical sensor data, radar data, lidar data, signal strength (of, for example, communication devices), determined vehicle orientation (particularly when mechanically coupled vehicles form part of the vehicle group), wayside device information, reference to beacons (vehicle mounted and/or wayside mounted), and the like. The consist or vehicle group information may include a consist message or position report from Vehicle 2, that Vehicle 2 is in the same vehicle group or consist as Vehicle 1, that Vehicle 2 has on-board sensors indicating that Vehicle 2 is in the extreme right lane (no lanes sensed to the right+lanes sensed to the left), that Vehicle 1 is directly behind Vehicle 2 and within rear-facing lidar sensor of Vehicle 2, etc. The vehicle-to-vehicle spacing may be a measured or input value of the separation distance between adjacent vehicles or non-adjacent vehicles in the vehicle group. The optical sensor data may be output from a camera or other optical sensor that indicates the relative position or location of one vehicle relative to another vehicle. The radar data can include output from a radar system that indicates the presence of another vehicle, the vehicle-to-vehicle spacing, the lateral distance between a vehicle and a guard rail or wall, etc. The lidar data can include output from a lidar system that indicates the presence of another vehicle, the vehicle-to-vehicle spacing, the lateral distance between a vehicle and a guard rail or wall, etc. The signal strength data can include a measurement of the strength of a wireless signal sent by one vehicle or device to another vehicle or device. Stronger signal strength measurements can indicate that the vehicles or devices are closer together (e.g., the vehicle-to-vehicle spacing is shorter) while weaker signal strength data can indicate that the vehicles or devices are farther apart (e.g., the vehicle-to-vehicle spacing is longer). The vehicle orientation can be used to determine the location of a first vehicle based on the location of a second vehicle and the vehicle-to-vehicle spacing. For example, the location of a first vehicle may be determined to be a first location when the GNSS receiver on the second vehicle is toward the front end of the second vehicle and the second vehicle is facing the same direction as the first vehicle, but the location of the first vehicle may be determined to be a different, second location when the second vehicle is facing the opposite direction as the first vehicle. The wayside device information and reference to beacons can be used to determine locations of vehicles or vehicle groups by the vehicles or vehicle groups receiving wireless signals from the wayside devices or beacons that indicates locations of the devices or beacons.

The system may conclude that, based at least in part on the available location information, that Vehicle 2 is in a particular lane and Vehicle 1 is also in that same lane and behind Vehicle 2 relative to the direction of travel. The spatial relationship may be used to determine a location of one or the other of the vehicles. Discrepancies between Vehicle 1 location information may be handled using, for example, determined threshold values for accuracy and location. That is, if it is reasonable that Vehicle 1 is behind Vehicle 2 based on a margin of error, then the location of Vehicle 1 is accepted. If it is unreasonable (e.g., the determined location of Vehicle 1 is outside of the margin of error based on the location information from Vehicle 1), then an alert is generated. In one embodiment, the vehicles involved are moved to a safe stop mode.

In one embodiment, the back-office server can receive information including the position of each vehicle in the vehicle group from the central dispatch, e.g., a computer-aided dispatch (CAD) system. The messages from the central dispatch may include a field that indicates the position of each vehicle in the vehicle group. The back-office server can receive position reports from each vehicle in the vehicle group. The position reports include earth-centered, earth-fixed (ECEF) coordinates for the location of the vehicle within the uncertainty of the GNSS (e.g., GPS) system. This may be used, in one embodiment, to set an acceptable margin of error for location calculations.

Figure 3:
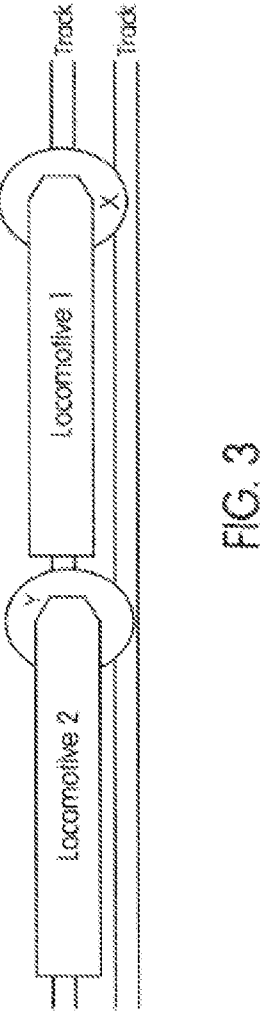
FIG. 3 is a schematic view of a vehicle group in an example route or lane network according to one embodiment.

As shown in the example of FIG. 3, position X, associated with Vehicle 1, may be closer to Route B than Route A, even though Vehicle 1 may be actually located on Route A. Accordingly, the actual location of position X may be ambiguous (e.g., based only on the location information associated with Vehicle 1, that is, position X, whether Vehicle 1 may be on Route A or Route B). The controller may determine a distribution of the locations associated with the vehicle and the other locations associated with the other vehicle and normalize the distribution to route centerline data and determine which route of plural routes on which the vehicle group may be located based at least partly on the normalized distribution. For example, the controller of one or more of the vehicles (L1, L2) can use the position Y, associated with Vehicle 2, in combination with the position X, associated with the Vehicle 1, to form a distribution of location information. This distribution of the location information associated with the positions X and Y can be normalized to the centerline of a route. The route centerline data may be stored in and retrieved from the route database and/or the back-office server and may include at least data or information sufficient to determine the centerline C (i.e., the center between the lateral edges of a route, such as the rails along a section of track) of the route T upon which the vehicle group may be located or traversing. The controller of one or more of the vehicles (L1, L2) can determine that the vehicle group may be on Route A based on the normalized distribution and, thus, that the Vehicle 1 may be on Route A.

For example, the controller of one or more of the vehicles (L1, L2) can compare the positions of vehicles in the same vehicle group against route database information including the route centerline location and any switches or intersections within the route. The position(s) from any one vehicle may be ambiguous in determining which route the vehicle may be on because an uncertainty of the position may allow the position to be valid for a vehicle on different routes that may be within close proximity. However, position reports from other vehicles may be distributed within an uncertainty or deviation value. By combining the position reports from more than one vehicle (L), the controller of one or more of the vehicles (L1, L2) can determine a normalized position that more clearly indicates the route that the vehicle group including the vehicle occupies. For example, if Vehicle 1 reports a position X that may be ambiguous (due to uncertainty) as to whether the vehicle group may be located on Route A or Route B. A vehicle on either Route A or B could report that position. However, the position report Y from Vehicle 2 may be too far from Route B (beyond uncertainty limits with respect to the centerline of Route B) and, therefore, must be associated with a vehicle on Route A, because there may be no other nearby routes (e.g., within the uncertainty limits). By combining the information including the position of each vehicle in the vehicle group received from the central dispatch, which indicates that Vehicle 1 and Vehicle 2 may be in the same vehicle group, and utilizing a route database that indicates there may be no switches or intersections on the route between Vehicle 1 and Vehicle 2, the location of Vehicle 1 can be determined to be on Route A, because the Vehicle is in the same vehicle group as the Vehicle 2 and the Vehicle 2 must be on Route A. Conversely, if the vehicles are not determined to be in the same group, if there are one or more intersections or switches between the determined locations of the vehicles, and/or the location of one of the vehicles is within the uncertainty limit of another route), then the route on which the vehicles are located may not be able to be determined.

Figure 4:
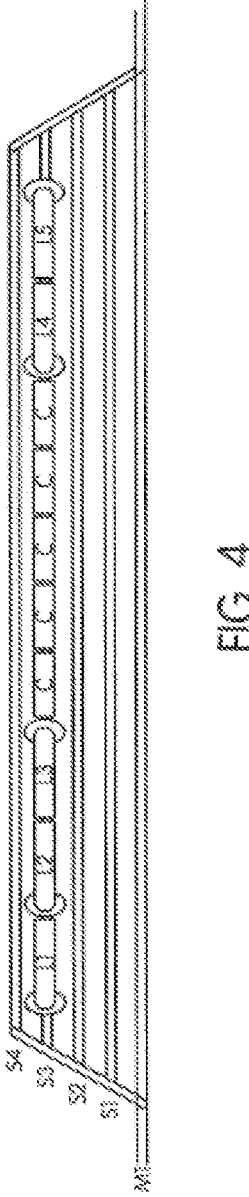
FIG. 4 is a schematic view of a vehicle group in an example route network according to one embodiment.

A number of control vehicles (L1, L2, L3, L4, L5) as shown in FIG. 4 in a vehicle group may allow the controller of one or more of the vehicles to reduce an uncertainty associated with a lane or route location determination by using positions associated with the greater number of vehicles to form the distribution and normalize the distribution to the route centerline data. For example, the greater number of vehicles enables the controller or back-office server to determine the normalized distribution based on a greater number of distribution points. This may provide relatively greater accuracy in determining the route or lane on which the vehicle group is actually located.

In one example, the location associated with the control vehicle of the vehicle group is formed from a plurality of locations associated with multiple other vehicles of the vehicle group. This may be information collected over a period of time. For example, the controller of one or more of the vehicles (L1, L2) can receive multiple GNSS position reports including location information, such as, GNSS (e.g., GPS_coordinates, from the positioning system on-board the same vehicle. In one embodiment, the controller or back-office server can receive multiple position reports from some or all of the vehicles of a vehicle group. The use of multiple position reports from the same vehicle to determine the distribution of location information can reduce the uncertainty associated with a route location determination because a GNSS position of a stopped vehicle may drift over time within an uncertainty bubble.

The controller may receive or determine a relative position of the control vehicle and another vehicle of the vehicle group in a lane or envelope, or on a route, receive or determine a direction and orientation of the control vehicle, and determine based at least in part on the direction and orientation the direction of travel of the entire vehicle group.

The controller of at least one of the control vehicles can receive or determine consist information indicating the relative position of the control vehicle(s) in the vehicle group and a direction of orientation of at least the first control vehicle (L1). The controller of another of the vehicles can receive the orientation of the lead (first) vehicle (L1). The orientation of the lead (first) vehicle (L1) may be either 1 for a front orientation or 2 for a back orientation, or another nomenclature or naming schema may be used. In one embodiment, this orientation can be confirmed by another data source, even by visual observation (e.g., such as by optical sensor data, radar data, or the like). The orientation of the rest of the vehicles in the vehicle group may be ascertained relative to the first vehicle's orientation. The orientation of the first vehicle (L1) can be used to determine which direction the vehicle group will move when the first vehicle (L1) begins to move.

In one embodiment, when a consist message is received by the controller of a vehicle during initialization of the vehicle, one or more (or all) other vehicles in the vehicle group in which the vehicle may be located can be identified or known by the controller from the consist message. In one embodiment, the vehicles may exchange an electronic handshake when joining (and optionally leaving) the vehicle group. The controller of a control vehicle in the vehicle group can request/gather vehicle position report messages from the other vehicles in the vehicle group or consist. The controller can issue a new query message (vehicle-to-vehicle) or query the back-office server for the information about the vehicles in the vehicle group. A group of the most recent position reports for each vehicle (e.g., about three position reports) may be sent to provide a better distribution for the analysis to determine the route, lane or envelope in or on which the vehicle group may be located, the relative position of the vehicles within the group, and relative orientations. In another embodiment, suitable reports may include information about the vehicles (type, weight, stopping capabilities, min/max/optimum speeds, cargo type, cargo amount, health status, brake condition, fuel level, fuel type, final destination, and the like).

In one embodiment, the controller of a control vehicle can determine the direction of travel of the vehicle group by comparing the position of the vehicles in the vehicle group.

For example, a vehicle orientation and a throttle position of the first vehicle (L1) may be determined, and the controller can determine the direction of travel of the vehicle group without the vehicle group needing to move to predict an expected direction of travel. By predicting movement (before actually moving), the controller may improve safety and efficiency.

The position reports from multiple vehicles known to be in the same vehicle group can be used to determine a direction of travel for the vehicle group. The information about the vehicles in the vehicle group, such as the consist information, may provide the position of each vehicle in the vehicle group with the first control vehicle (L1) being designated as position 1. By comparing the relative positions of each vehicle in the same vehicle group, after translating them to a lane or route location, a direction of travel may be determined. The reverse is also possible. In FIG. 4, knowing that vehicle L1 is in position 1 and L5 is in position 10, and position reports from each indicating the direction of travel for the vehicle group, the system can be determined that forward movement of the vehicle group would be from L5 toward L1.

By analyzing the vehicle position data of the vehicle group, the controller of one or more of the control vehicles can determine that the vehicle group including the control vehicles may be on Siding or Route 3, with Vehicle 1 being the lead vehicle, and that the direction of travel would be to the left if the Vehicle 1 were throttled up and the reverser handle was in the forward position. The direction of travel may be specific to the vehicle group. A step in determining direction of movement of the vehicle group may be to couple the direction of travel with the orientation and throttle position of the first vehicle (L1) to determine which way the vehicle group will move. This can be done before the vehicle group moves. The position information showing a change from L1 and L5 enables a determination that forward direction of travel for the vehicle group will be from L5 toward L1, and the opposite direction for reverse. Moving the vehicle group to the left or right can be accomplished in a similar manner. In some embodiments, moving the vehicles up and down may be accomplished. If the orientation of the first vehicle is toward front and the throttle is in forward, or if the orientation of the first vehicle is back and throttle is in reverse, the vehicle group's direction of movement will be from L5 toward L1. Conversely, if the orientation of the first vehicle may be front and handle position may be reverse or if the orientation of the first vehicle may be back and the handle position may be forward, the direction of movement of the vehicle group will be from L1 toward L5.

Figure 5:
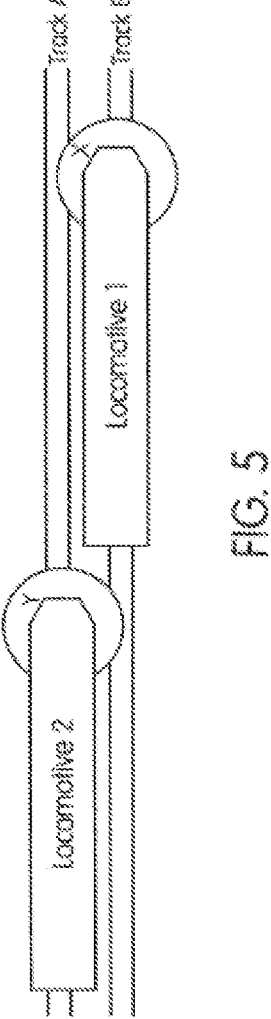
FIG. 5 is a schematic view of a vehicle group in an example track network according to one embodiment.

In one example, the controller may receive or determine a second location associated with a second control vehicle of a second vehicle group in the route network. It may determine the lanes or routes on which one or more members of the vehicle group may be located based at least partly on the second location associated with the second vehicle. For example, an uncertainty in the route location of a vehicle group can be reduced if position reports from vehicles of other vehicle groups nearby the vehicle group in the route network may be considered in determining the route location of the vehicle group. Referring to FIG. 5, the controller of the first control vehicle can determine, based at least partly on the additional location (Position Y in FIG. 5) associated with the second control vehicle, an amount of skew associated with the location (Position X in FIG. 5) of the first vehicle and adjust the location associated with the first vehicle based on the determined skew.

During operation, it may be unclear based on the position information (i.e., Position X) associated with Vehicle 1 whether Vehicle 1 may be on route B or route A. The controller of the Vehicle 1 can analyze the location information associated with the Vehicle 1 against the location information of one or more other nearby vehicles to determine an amount of skew in the distribution of location information of the vehicles. The positions associated with Vehicle 1 and the nearby vehicles may be skewed in the same direction. Vehicle 2 as shown in FIG. 5 must be on Route A based on the location information (Position Y) associated therewith and the layout of the routes A and B. The controller and/or the back-office server can determine that the location information associated with Vehicle 2 (Position Y) may be skewed a certain distance and direction from the route centerline of Route A based on the Position Y and route centerline data for route A. The controller and/or back-office server can determine that the location information associated with Vehicle 1 (Position X) may be skewed the same distance and direction (i.e., the same distance and direction) that would move Position Y to the centerline of Route A. The controller and/or the back-office server can adjust the Position X based on determined distance and direction of the skew to move the location information (Position X) to the centerline of Route B, and determine based on the adjusted location information associated with the Vehicle 1 that the Vehicle 1 may be on Route B. This adjusted position can then be used for determining how to control movement of the vehicles.

Second location information associated with the second vehicle can include a plurality of second locations associated with the second vehicle over a period of time. For example, the controller of Vehicle 1 can analyze the position information associated with other vehicle groups in addition to, or in place of, the vehicle groups of which Vehicle 1 and Vehicle 2 are members. This second location information may include other vehicles on other routes or in other lanes to determine an amount of skew or drift associated with their position information. With that, a correction factor may be determined, and the controller may adjust the position information based on the determined skew or drift. The controller may identify the second vehicle of the second vehicle group in the route network based on, for example, a distance of the second vehicle of the second vehicle group from the other vehicle, a freshness of the information, or other factors that emulate the current situation. The controller of Vehicle 1 or can use a proximity algorithm to find vehicles within a threshold distance (e.g., one thousand feet) of the first vehicle and the position reports of the vehicles identified to be within the threshold distance can be requested from the vehicles and/or the back-office server and analyzed to determine the route location of the Vehicle 1.

In another example, the controller may determine a position of an intersection or a switch proximate to the vehicle group based at least partly on the location associated with the vehicle and the other location associated with the other vehicle. If the controller of a control vehicle determines that a first group is on Main Route 1 and a second group is on Main Route 2, and there is no ambiguous or other route under the vehicle group (e.g., between Main Routes 1 and 2), the controller or the back-office server can determine the position of the intersection or switches involved or located between the Main Routes 1 and 2. This may improve the safety of the vehicle network control system by enabling the enforcement of any speed or other restrictions under the vehicle group instead of waiting until the vehicle group has traveled the length of the vehicle group.

In one embodiment, when there may be multiple vehicles known to be in the same vehicle group or consist, the position reports of the vehicles may determine which route those vehicles are occupying. If there is an intersection or a switch between the groups of vehicles, the operation of the traffic signal equipment and/or alignment of the switch may be determined. For three vehicles known to be in the same vehicle group and in positions 1, 2, and 3, the position reports of the three vehicles in the same vehicle group may be used to determine that those vehicles are on Route A or to control the vehicles to be on Route A. However, for three other vehicles known to be in the same vehicle group at positions 98, 99, and 100, the relative position reports of the three other vehicles in the same vehicle group may be used to determine that the other vehicles may be on Route B or to control the vehicles to be on Route B. If the route database shows that there are no connections between Route A and Route B, an error condition may be detected or identified, and route selection/direction of travel may be discarded and/or an alert generated. However, if the route database shows two switches connecting Route A and Route B between the positions of the vehicles at the front (1, 2, and 3) and the other vehicles at the rear (98, 99, and 100), the controller can determine the alignment of the two switches to be reverse for each switch, because that may be the only possible path based on route selection and the vehicles/vehicles known to be in the same vehicle group. Once identification of a route or lane is made, the controller may cause the vehicle(s) to switch lanes or routes if not on a desired route or lane, and/or may change the state or condition of the switch(es).

As used herein, the terms "communicatively coupled", "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. Suitable electronic communication protocols and/or algorithms may be used. Examples may include TCP/IP (including HTTP and other protocols), WLAN (including 802.11 and other radio frequency-based protocols and methods), analog transmissions, and/or the like. It is to be noted that a "communication device" includes any device that facilitates communication (whether wirelessly or hardwired (e.g., over the rails of a track, over a vehicle powerline extending)) between two vehicles. A suitable "communication device" is a radio transceiver programmed, configured, or adapted to wirelessly transmit and receive radio frequency signals and data over a radio signal communication path.

The system and computer-implemented method for determining a route location and a direction of travel described herein may be implemented in a variety of systems and vehicular networks; however, the systems and methods described herein may be useful in connection with a railway system and track network, a roadway system and traffic control system, a mine, waterway navigation and shipping lanes, and aircraft and drone operation within flying envelopes. The systems and methods described herein are useful in connection with and/or at least partially implemented on one or more control vehicles or cars that make up a vehicle group. Multiple control vehicles or cars may be included in the vehicle group to facilitate the reduction of the vehicle group to match with passenger, freight, or some other demand or requirement. Further, the method and systems described herein can be used in connection with commuter vehicle groups, freight vehicle groups, bus fleets, truck fleets, passenger vehicles, drone swarms, and/or other vehicle group arrangements and systems. Still further, the vehicle group may be separated into different configurations (e.g., other vehicle groups) and moved in either a first direction and/or a second direction (that is, forward or backward, left or right, up or down). Any configuration or arrangement of vehicles, control cars, and/or railroad cars may be designated as a vehicle group, platoon, and/or a consist.

One embodiment of the inventive subject matter described herein provides a system, method, and apparatus for determining a location of a vehicle group, and particularly, a location of an end of the vehicle group. The system can include a plurality of passive transponders located throughout a route network that each include transponder data uniquely identifying a route segment or location where the transponder is positioned, such as, but not limited to, a portion of a route, a switch, an intersection, a region, coordinates, and/or the like. The transponder data may be any type of data that uniquely identifies a route segment or location and that may include a unique identifier that can be correlated with a route location from a route database. Moreover, the transponders may be located anywhere throughout a route network and, in a preferred and non-limiting embodiment, may be located adjacent a clearance point of a switch or adjacent a route segment approaching a clearance point of a switch. It will be appreciated, however, that transponders may be positioned at other locations throughout the route network to control movement of multiple vehicle groups by establishing boundaries that may be used to hold vehicle groups in a particular location for traffic control.

A vehicle groups can include an end-of-group device such as an end-of-train (EOT) device. The description below relates to an EOT device, but not all embodiments are limited to trains. The EOT device can represent a device onboard another type of vehicle group, as described herein. The EOT device can be arranged at an end of the vehicle group (e.g., on an end of a rear railcar) that includes a signal receiving device. Optionally, the signal receiving device may be in another location of the vehicle. The signal receiving device optionally can be referred to as a transponder reader device that reads or otherwise obtains information from the transponders (e.g., via RFID interrogation or reading, optical reading with a camera, etc.). The passive transponders and signal receiving device are configured such that when a vehicle group is traveling on a track, the signal receiving device activates and receives data from the stationary transponders. Thus, the transponders may be located on the route, adjacent the route, or in sufficient proximity to the route such that the signal receiving device is able to communicate with the transponders. Using the transponder data stored on the transponders, an on-board computer on the vehicle group and/or the EOT device determines a location of the vehicle group and, particularly, a location of an end of the vehicle group relative to the route. By using passive transponders rather than active wayside equipment, less maintenance is required.

Figure 6:
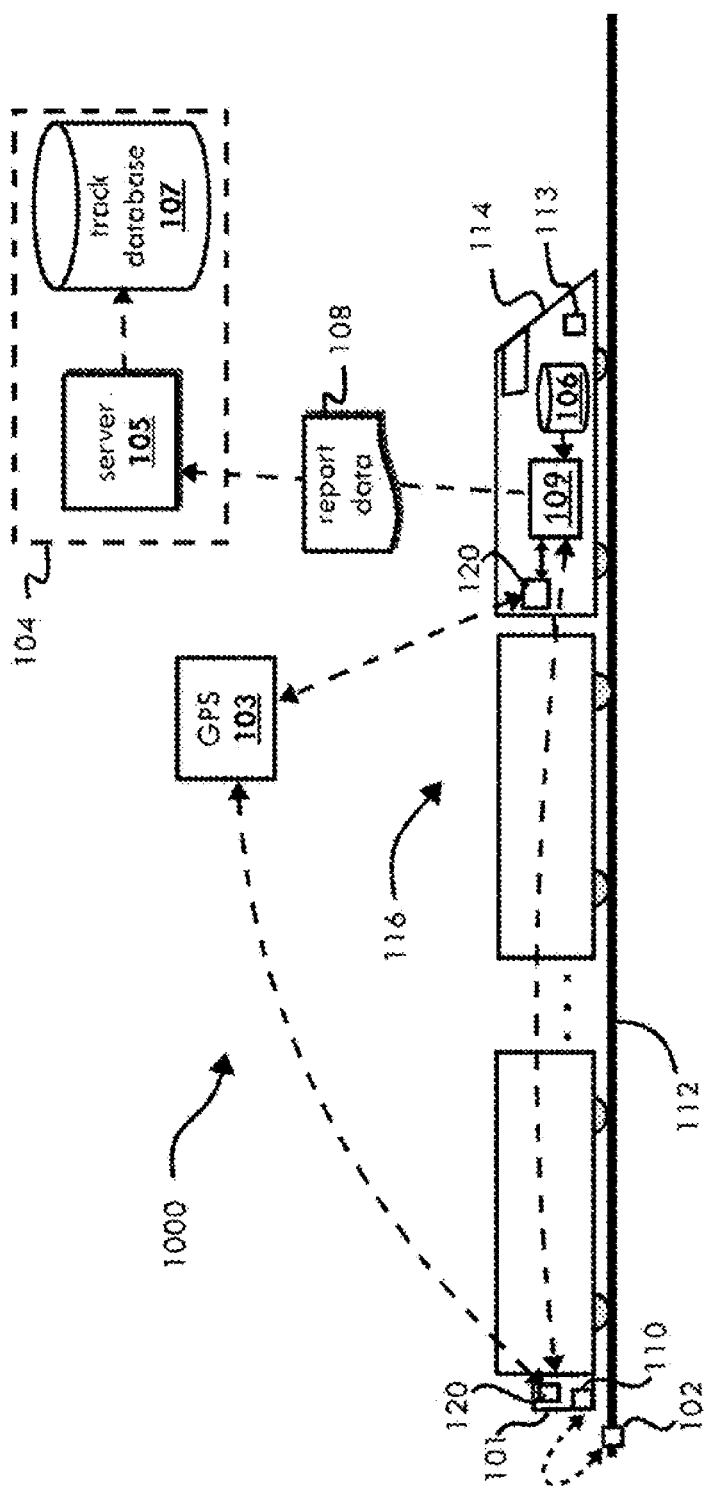
FIG. 6 illustrates a schematic diagram of one embodiment of a system for determining a position of a vehicle group device according to one embodiment.

Referring to FIG. 6, a system 1000 for determining a location of a vehicle group 116 is shown according to one example. The vehicle group may be traveling on a route 112 and may include a propulsion-generating vehicle 114 (e.g., a locomotive, truck, automobile, boat, etc.) and an EOT device 101. Optionally, the EOT device may be onboard the vehicle group in another position (e.g., not the end position). An on-board computer 109 located in the vehicle is in communication with a route database 106 in the vehicle or elsewhere on the vehicle group, and a remote back office system 104. The EOT device includes a signal receiving device 110 which communicates with a transponder 102 while in sufficient proximity to the transponder. In one embodiment, an additional signal receiving device 113 may be located in the vehicle or another vehicle (e.g., a non-propulsion-generating vehicle) and may be configured to communicate with the transponder.

With continued reference to FIG. 6, the transponder may include any signal emitting device that communicates data in response to being activated. For example, the transponder may be a passive radio frequency identification (RFID) transponder (e.g., tag) and the signal receiving device may be an RFID reader that energizes the transponder to retrieve data stored thereon. It will be appreciated, however, that the transponder may include any number of signal-emitting devices such as, for example, near field communication (NFC) tags, low-power Bluetooth® devices, and/or the like, and that the signal receiving device may include any device capable of communicating with the transponder. The plurality of transponders located throughout the route network may be the same type of transponder or, in other examples, may differ such that more than one type of signal receiving device is used in the EOT device, or the signal receiving device may be programmed or configured to communicate with different types of transponders using different communication protocols. It will be appreciated that other variations are possible.

A plurality of printed data sources (e.g., a two- or three-dimensional barcode, a visual code, printed text, etc.) may be used. In such examples, the EOT device is configured to illuminate or otherwise record the printed data source (e.g., with an infrared light or another light source), and capture the data printed thereon with an image capture device. The EOT device and/or on-board computer may then decode and/or process the captured image to obtain the data encoded or printed thereon.

Still referring to FIG. 6, the on-board computer may be in communication with a positioning system, such as a GNSS or GPS satellite 103 (where the on-board computer is in communication with a GNSS or GPS receiver 120 on the vehicle group), to determine or receive positional coordinates of the vehicle group. Various other techniques may also be used to determine the position of the vehicle group such as, for example, axle counters, signal triangulation, wheel tachometers, and/or the like. The on-board computer may use data received from the transponders to confirm and/or verify the location of the vehicle group as determined by GNSS (e.g., GPS) and/or other methods. The transponders may be used as a failsafe mechanism for verifying that the location of the vehicle group, as determined by the GNSS (e.g., GPS), axle counters, signal triangulation, wheel tachometers, and/or the like, is correct.

The location of the vehicle group, as determined by GNSS and/or other methods, may also be used to determine when a transponder is expected to be encountered. For example, using the determined location of the vehicle or vehicle group, the moving speed (or expected moving speed, such as the speed limit of the route), and/or the location of the transponder, the time at which the vehicle system should arrive at the transponder can be calculated. This provides information for the EOT device or other reader that communicates with the transponder when to anticipate the transponder. This can allow the EOT device or reader to activate the transponder at the appropriate time. Because activating a transponder utilizes power, attempting to activate a transponder only when the transponder is anticipated or expected, rather than continually or repeatedly, minimizes or reduces the amount of power that the EOT device or reader consumes. Optionally, the transponders may also be used as a primary source for determining vehicle group location, and the GNSS receiver and/or other like devices and methods may be used to confirm such determinations or may not be used at all. A GNSS receiver 120 may be located in the vehicle and/or the EOT device. The location data received from the GNSS receiver(s) may be used to determine or confirm the length of the vehicle group.

The back office system can include a back office system server 105 and a remote route database 107. The on-board computer 109 may generate report data 108 and may communicate this data to the back office system server. This server can store the report data or a portion thereof in the remote route database. The report data may include the transponder data and/or be generated by the on-board computer based on various inputs including, for example, the transponder data obtained from the signal receiving device. The report data may also include raw, unprocessed data received from the signal receiving device (e.g., the transponder data itself), or may be processed and/or combined with other data by the EOT device and/or on-board computer. Moreover, the EOT device may also be in communication with the back office system and may transmit report data received from the transponder and/or derived from the transponder data directly to the back office system server upon receiving the data or at intervals.

The report data may be communicated to the back office system server as the data is received and/or determined, or may be communicated at a predetermined interval or time period. For example, once a position of the EOT device is confirmed to have passed a transponder (or some other location on the route), the on-board computer and/or EOT device may transmit the report data to the back office system server where the data is stored in the remote route database. The report data can then be used by the back office system server, other remote systems, and/or personnel to make decisions for safely moving switches or routing vehicle groups through the route network. The back office system server and/or other remote systems may implement one or more algorithms for generating vehicle group and/or switch commands based on the report data.

The transponder data stored on or otherwise accessible to the transponders include a unique identifier that uniquely identifies the transponder and/or a location of the transponder. For example, a unique identifier from a transponder may correspond to a route location in the route database(s) such that the position of the vehicle group, and particularly the position of the front and/or end of the vehicle group, can be correlated with the route database(s). In one example, the route database(s) may include identifiers corresponding with route locations (e.g., geographic locations, landmark-based locations, specific route segments or switches, etc.), such that the unique identifier from the transponder data may be matched to an identifier in the route database(s) to determine a route location. Unique identifiers may be in any suitable format such as, for example, integers, alphanumeric strings, coordinates, and/or the like. In this manner, the on-board computer may receive the transponder data from a transponder, extract or determine a unique identifier from the transponder data, and look-up the unique identifier on the on-board route database to find a corresponding identifier associated with a route location. The on-board computer may then generate the report data based on the unique identifier and/or corresponding information retrieved from the route database. Transponder data may alternatively or additionally be correlated with the remote route database.

In one example, a failsafe protocol may be implemented by the on-board computer and/or EOT device to confirm the detection of a transponder. A signal receiving device 113 in the vehicle and a signal receiving device 110 in the EOT device may both detect and/or obtain transponder data from the transponders. The on-board computer and/or EOT device may then compare the transponder data and/or ensure that transponder data is received by both signal receiving devices.

Figure 8:
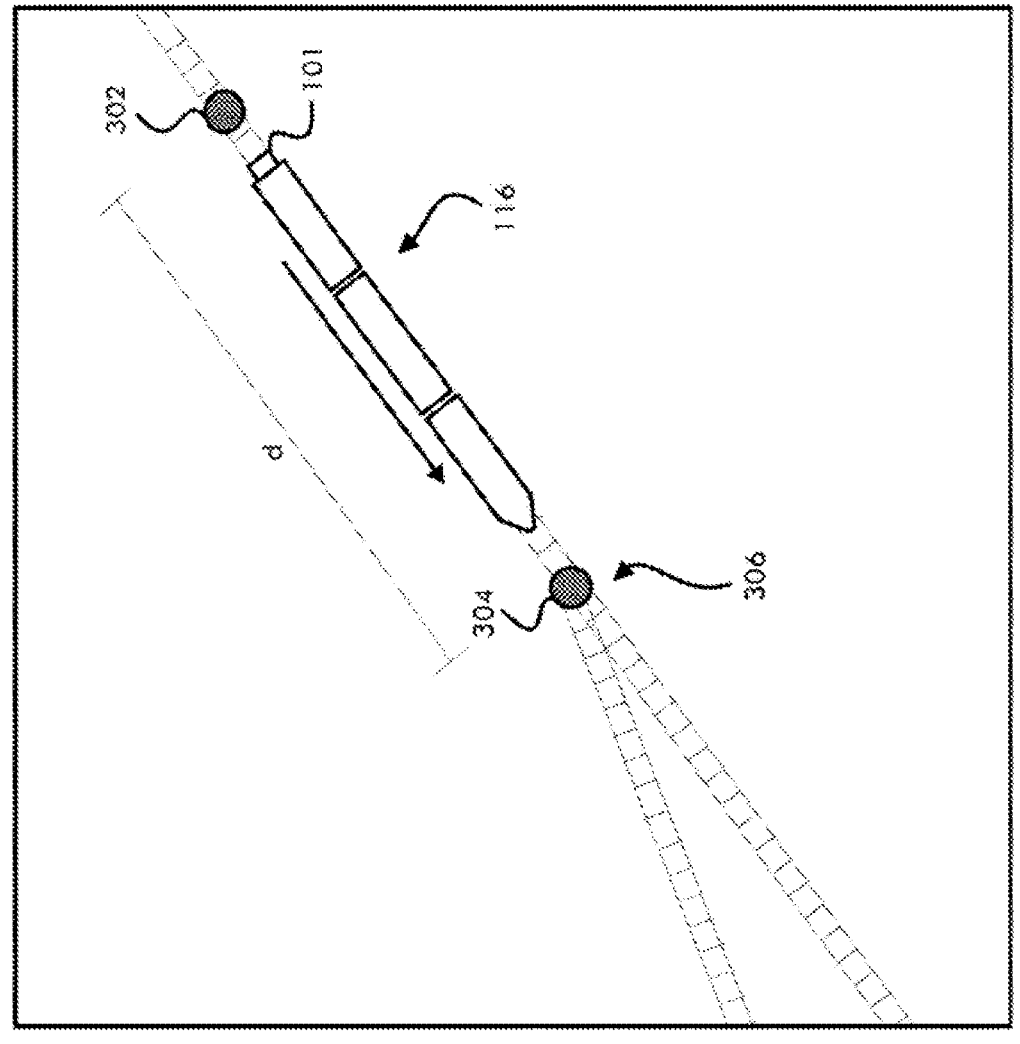
FIG. 8 illustrates a vehicle group traveling in a route network according to one embodiment.

Referring to FIG. 8, a vehicle group 116 traveling in a route network is shown according to one example. A clearance transponder 304 may be located at a clearance point of a switch or intersection 306 in the route network to facilitate a determination of when the vehicle group has passed the clearance point. The switch may have two clearance points, one for each leg of the switch, and therefore two clearance transponders. An intersection may have a single clearance point. A vehicle is out of or clear of the switch or the intersection once the vehicle has passed the clearance point of the switch or intersection. Depending on which leg of the switch the vehicle group was traveling, one of the two clearance transponders may be activated. Once it is determined that the vehicle or vehicle group has passed the clearance transponder, and therefore the clearance point, the switch can be moved or another vehicle group can be routed on the associated route segment. With respect to an intersection, once it is determined that the vehicle or vehicle group has passed the clearance transponder, the intersection may be identified as being open or clear for passage of another vehicle. Prior to making the determination that the vehicle or vehicle group has cleared the switch or intersection (e.g., passed the appropriate clearance point by communicating with the corresponding clearance transponder), other vehicles or vehicle groups may be prohibited from entering into or passing through the switch or intersection. For example, a light (or other signal) may be illuminated with a color indicating that other vehicles cannot enter into or pass through the switch or intersection, a gate may be lowered to prevent other vehicles from entering into or passing through the switch or intersection, the onboard computers of the other vehicles may automatically brake or slow the other vehicles to prevent entry into the switch or intersection, etc. The vehicles can communicate with each other (directly or indirectly, such as via an off-board system or device) to inform each other when the vehicles are or are not clear of a switch or intersection. The other vehicles can then automatically restrict movement (by slowing, by stopping, by moving onto another route that does not include the switch or intersection) responsive to receiving signals that a vehicle is in the switch or intersection. This can assist in decreasing collisions between vehicles.

An approach transponder 302 may be located at a distance (d) from the switch or intersection in the route, and the clearance transponder may be located substantially proximate to the switch or intersection (e.g., closer to the switch or intersection than the approach transponder). Optionally, the clearance transponder may be located at a distance past the switch or intersection, or in another location. The EOT device may have a signal-receiving device for receiving data from the transponders.

After passing the approach transponder, the signal-receiving device may obtain transponder data from the approach transponder. The transponder data received from the approach transponder may be used to confirm that the signal receiving device is working properly as the vehicle or vehicle group approaches the clearance transponder that is located at a clearance point of the switch or intersection, and to indicate to the EOT device and/or on-board computer of the vehicle or vehicle group that detection of another transponder (e.g., the clearance transponder) can be expected. For example, the approach transponder may be located at a distance (d) from the switch, intersection, or other clearance point to account for GNSS position errors. After detecting the approach transponder, the on-board computer and/or EOT device of the vehicle or vehicle group may then utilize a method or device for determining the distance traveled, such as but not limited to a wheel tachometer, to independently determine when the clearance point associated with the clearance transponder can be expected. This can assist with the detection of the clearance transponder to avoid the clearance transponder being missed once the vehicle or vehicle group leaves the switch or intersection. Otherwise, the clearance transponder may be missed, and the vehicle or vehicle group is unable to send messages to other vehicles to notify the other vehicles that the vehicle or vehicle group has cleared the switch or intersection. Two or more transponders may be used in any given location or region for redundancy. Transponders may also be used in connection with other clearance points, such as vehicle group stations, authority blocks, and/or the like.

Figure 7:
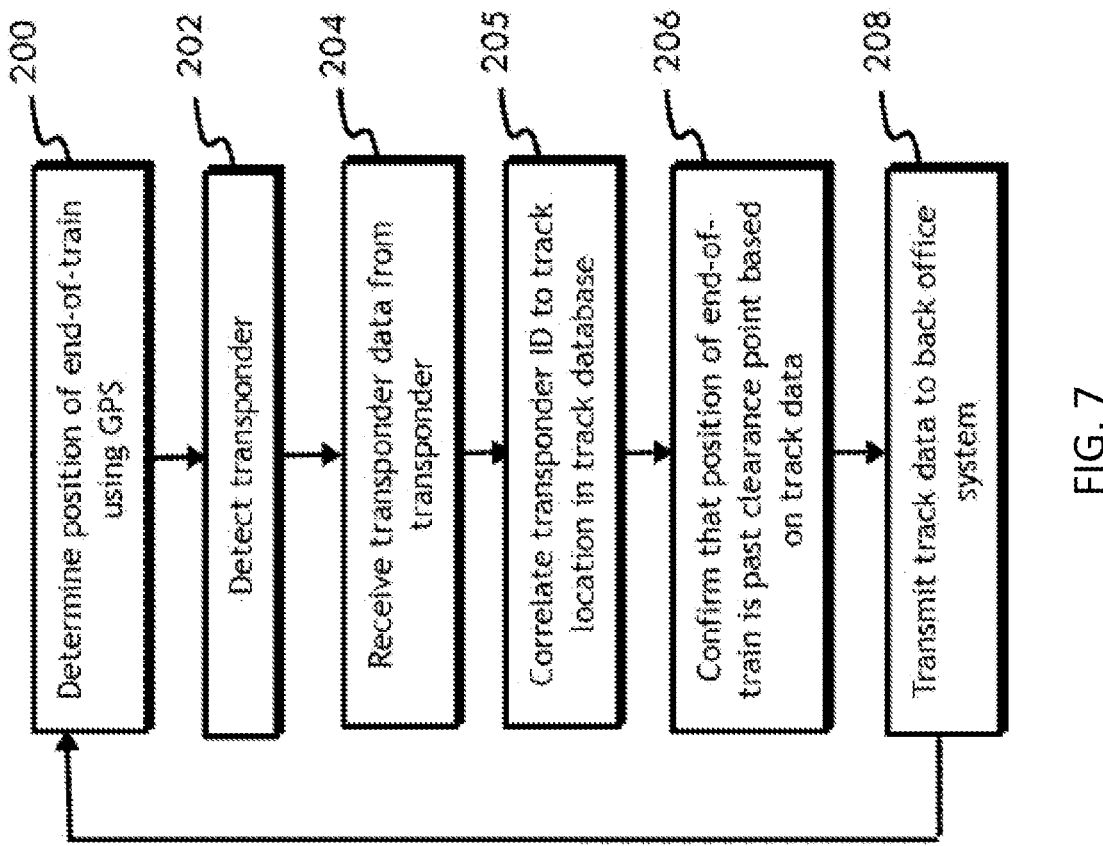
FIG. 7 illustrates a flowchart of a method for determining a position of a vehicle group device according to one embodiment.

Referring to FIG. 7, a method for determining the location of a vehicle or vehicle group is shown according to one example. At step 200, the position of the vehicle or vehicle group is determined. For example, the location of an EOT device of the vehicle or vehicle group may be determined using GNSS or another suitable method. At step 202, a stationary transponder in the route network is detected. At step 204, transponder data is received from the transponder by, for example, activating a passive transponder. At step 205, a unique identifier from the transponder data is correlated to a route location in a route database. At step 206, the position of the vehicle, vehicle group, or EOT device is confirmed to be past a clearance point based on the transponder data received from the transponder and the corresponding route location retrieved from the route database. At step 208, the transponder data may be submitted to a back office system.

The on-board computer may determine that the position of the vehicle group and/or EOT device is past a particular route segment. The on-board computer may also use the EOT device position to release authority for a following vehicle group to use the route segment. Thus, the data submitted to a back office system may include a location of the front of the vehicle group, a location of the end of the vehicle group (or EOT device), and/or a release of movement authority.

Figure 9:
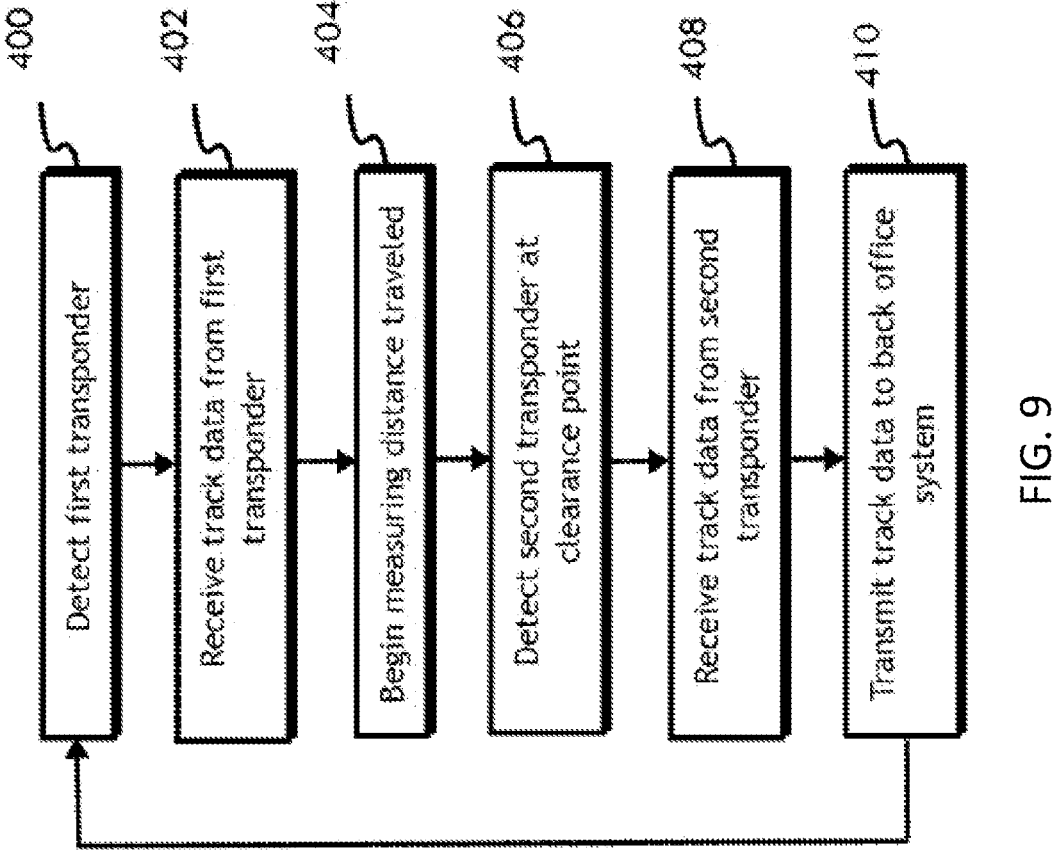
FIG. 9 illustrates a flowchart of a method for determining a position of a vehicle group device according to one embodiment.

Referring now to FIG. 9, a method for determining the location of a vehicle, vehicle group, or an EOT device using an approach transponder is shown according to one example. At step 400, a first transponder (e.g., an approach transponder) may be detected (e.g., by a signal receiving device). At step 402, transponder data is received from the first transponder. Using this transponder data, the operability of the signal receiving device can be confirmed. At step 404, the distance traveled by the vehicle or vehicle group may be measured using, for example, a wheel tachometer, a dead reckoning system, etc. At step 406, a second transponder may be detected at a clearance point. Transponder data may then be received from the second transponder at step 408. At step 410, at least a portion of the transponder data, such as but not limited to an indication that the vehicle group has passed the clearance point, is transmitted to a back office system, another vehicle, and/or another vehicle group.

The system 1000 for determining a location of a vehicle or a vehicle group can be used for implementing moving block vehicle group control without the need for active (e.g., powered) wayside equipment. By determining the locations of vehicles or vehicle groups throughout a route network with the system, one or more movement authorities may facilitate movement of the vehicle groups at a closer proximity.

In one example, a method to determine the location of a vehicle group may be performed by at least one non-transitory computer-readable medium including program instructions that, when executed by at least one processor, cause one or more devices to perform the steps. With the sole exception of transitory propagating signals, a non-transitory computer-readable medium may include any medium capable of storing data such as, but not limited to, random-access memory (RAM), read-only memory (ROM), hard drives, compact and floppy discs, and/or other like mediums.

In one embodiment, the systems described herein may have a local data collection system deployed that may use machine learning to enable derivation-based learning outcomes to determine locations of vehicles and/or vehicle groups. The controller may learn from and make decisions on a set of location data (including data provided by various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The controller can use this artificial intelligence or machine learning to receive input (e.g., a location or change in location), use a model that associates locations with different operating modes to select an operating mode of the one or more functional devices of the HOV unit and/or EOV unit, and then provide an output (e.g., the operating mode selected using the model). The controller may receive additional input of the change in operating mode that was selected, such as analysis of noise or interference in communication signals (or a lack thereof), operator input, or the like, which indicates whether the machine-selected operating mode provided a desirable outcome or not. Based on this additional input, the controller can change the model, such as by changing which operating mode would be selected when a similar or identical location or change in location is received the next time or iteration. The controller can then use the changed or updated model again to select an operating mode, receive feedback on the selected operating mode, change or update the model again, etc., in additional iterations to repeatedly improve or change the model using artificial intelligence or machine learning.

In one example, a vehicle control system is provided that includes a controller that may receive location data points indicative of locations of a vehicle as measured by a location sensor. This controller may determine a distribution of the location data points and identify one or more of a route or a lane of a route in which the vehicle is disposed by comparing the distribution of the location data points to one or more characteristics of the one or more of the route or the lane of the route.

The controller may control movement of the vehicle based on the one or more of the route or the lane of the route that is identified. This controller may identify the one or more of the route or the lane of the route by comparing the distribution of the location data points to different centerlines of different routes or different lanes. The vehicle may be a first vehicle in a vehicle group that also includes at least a second vehicle. The controller may determine the distribution of a combination of the location data points provided by the first vehicle and the second vehicle. The controller may identify the one or more of the route or the lane of the route by comparing the distribution of the combination of the location data points to the one or more characteristics of the one or more of the route or the lane of the route.

The controller may disregard one or more of the location data points provided by the first vehicle or the second vehicle in identifying the one or more of the route or the lane of the route responsive to a switch or intersection being disposed between the first vehicle and the second vehicle. The controller may modify one or more of the location data points to match a centerline of the one or more of the route or the lane of the route responsive to the distribution including a skew.

Optionally, the system also may include a reader device that may be onboard the vehicle. This reader device may obtain one or more of the location data points from one or more passive transponders disposed along the route. The controller can determine whether the vehicle is clear of one or more of a switch or an intersection in the route based on the one or more of the location data points obtained from the one or more passive transponders. The one or more passive transponders may include an approaching passive transponder located ahead of the switch or the intersection along a direction of travel of the vehicle and a clearance passive transponder located after the switch or the intersection along the direction of travel of the vehicle. The controller may determine that the vehicle is clear of the switch or the intersection responsive to obtaining at least one of the location data points from the approaching passive transponder and the clearance passive transponder.

In another example, a method (for identifying which lane or road a vehicle is in and/or for controlling movement of the vehicle) is provided. The method may include receiving location data points indicative of locations of a vehicle, determining a distribution of the location data points, and identifying one or more of a route or a lane of a route in which the vehicle is disposed by comparing the distribution of the location data points to one or more characteristics of the one or more of the route or the lane of the route.

The method also may include controlling movement of the vehicle based on the one or more of the route or the lane of the route that is identified. The route and/or the lane may be identified by comparing the distribution of the location data points to different centerlines of different routes or different lanes. The vehicle may be a first vehicle in a vehicle group that also includes at least a second vehicle. The distribution can be determined from a combination of the location data points provided by the first vehicle and the second vehicle. The route and/or the lane can be identified by comparing the distribution of the combination of the location data points to the one or more characteristics of the one or more of the route or the lane of the route.

The location data points provided by the first vehicle or the second vehicle may not be included in the distribution responsive to a switch or intersection being disposed between the first vehicle and the second vehicle. The method also may include modifying one or more of the location data points to match a centerline of the one or more of the route or the lane of the route responsive to the distribution including a skew.

One or more of the location data points may be obtained from one or more passive transponders disposed along the route. The method also may include determining whether the vehicle is clear of a switch and/or an intersection in the route based on the one or more of the location data points obtained from the one or more passive transponders.

In another example, a vehicle control system is provided. The system may include a controller configured to receive location data points indicative of locations of first and second vehicles of a vehicle group as measured by first and second location sensors. The controller may determine a distribution of the location data points and identify a route and/or a lane of a route in which the vehicle group is disposed by comparing the distribution of the location data points to one or more characteristics of the one or more of the route or the lane of the route.

The controller may identify the route and/or the lane by comparing the distribution of the location data points to different centerlines of different routes or different lanes. The controller may disregard one or more of the location data points provided by the first vehicle or the second vehicle responsive to a switch or intersection being disposed between the first vehicle and the second vehicle.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following clauses, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such clauses are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle control system comprising:
a controller configured to receive location data points indicative of locations of a vehicle as measured by a location sensor, the controller configured to determine a distribution of the location data points and identify one or more of a route or a lane of a route in which the vehicle is disposed by comparing the distribution of the location data points to one or more characteristics of the one or more of the route or the lane of the route.

2. The vehicle control system of claim 1, wherein the controller is configured to control movement of the vehicle based on the one or more of the route or the lane of the route that is identified.

3. The vehicle control system of claim 1, wherein the controller is configured to identify the one or more of the route or the lane of the route by comparing the distribution of the location data points to different centerlines of different routes or different lanes.

4. The vehicle control system of claim 1, wherein the vehicle is a first vehicle in a vehicle group that also includes at least a second vehicle, and the controller is configured to determine the distribution of a combination of the location data points provided by the first vehicle and the second vehicle, the controller configured to identify the one or more of the route or the lane of the route by comparing the distribution of the combination of the location data points to the one or more characteristics of the one or more of the route or the lane of the route.

5. The vehicle control system of claim 4, wherein the controller is configured to disregard one or more of the location data points provided by the first vehicle or the second vehicle in identifying the one or more of the route or the lane of the route responsive to a switch or intersection being disposed between the first vehicle and the second vehicle.

6. The vehicle control system of claim 1, wherein the controller is configured to modify one or more of the location data points to match a centerline of the one or more of the route or the lane of the route responsive to the distribution including a skew.

7. The vehicle control system of claim 1, further comprising a reader device configured to be disposed onboard the vehicle and to obtain one or more of the location data points from one or more passive transponders disposed along the route.

8. The vehicle control system of claim 7, wherein the controller is configured to determine whether the vehicle is clear of one or more of a switch or an intersection in the route based on the one or more of the location data points obtained from the one or more passive transponders.

9. The vehicle control system of claim 8, wherein the one or more passive transponders include an approaching passive transponder located ahead of the switch or the intersection along a direction of travel of the vehicle and a clearance passive transponder located after the switch or the intersection along the direction of travel of the vehicle, the controller configured to determine that the vehicle is clear of the switch or the intersection responsive to obtaining at least one of the location data points from the approaching passive transponder and the clearance passive transponder.

10. A method comprising:
receiving location data points indicative of locations of a vehicle;
determining a distribution of the location data points; and
identifying one or more of a route or a lane of a route in which the vehicle is disposed by comparing the distribution of the location data points to one or more characteristics of the one or more of the route or the lane of the route.

11. The method of claim 10, further comprising controlling movement of the vehicle based on the one or more of the route or the lane of the route that is identified.

12. The method of claim 10, wherein the one or more of the route or the lane of the route is identified by comparing the distribution of the location data points to different centerlines of different routes or different lanes.

13. The method of claim 10, wherein the vehicle is a first vehicle in a vehicle group that also includes at least a second vehicle, wherein the distribution is determined from a combination of the location data points provided by the first vehicle and the second vehicle, and the one or more of the route or the lane of the route is identified by comparing the distribution of the combination of the location data points to the one or more characteristics of the one or more of the route or the lane of the route.

14. The method of claim 13, wherein one or more of the location data points provided by the first vehicle or the second vehicle are not included in the distribution responsive to a switch or intersection being disposed between the first vehicle and the second vehicle.

15. The method of claim 10, further comprising modifying one or more of the location data points to match a centerline of the one or more of the route or the lane of the route responsive to the distribution including a skew.

16. The method of claim 10, wherein one or more of the location data points is obtained from one or more passive transponders disposed along the route.

17. The method of claim 16, further comprising determining whether the vehicle is clear of one or more of a switch or an intersection in the route based on the one or more of the location data points obtained from the one or more passive transponders.

18. A vehicle control system comprising:
a controller configured to receive location data points indicative of locations of first and second vehicles of a vehicle group as measured by first and second location sensors, the controller configured to determine a distribution of the location data points and identify one or more of a route or a lane of a route in which the vehicle group is disposed by comparing the distribution of the location data points to one or more characteristics of the one or more of the route or the lane of the route.

19. The vehicle control system of claim 18, wherein the controller is configured to identify the one or more of the route or the lane of the route by comparing the distribution of the location data points to different centerlines of different routes or different lanes.

20. The vehicle control system of claim 18, wherein the controller is configured to disregard one or more of the location data points provided by the first vehicle or the second vehicle responsive to a switch or intersection being disposed between the first vehicle and the second vehicle.

* * * * *